United States Patent
Phillips et al.

[15] 3,689,937
[45] Sept. 5, 1972

[54] RECORDING STYLI AND CONTROL CIRCUITS FOR STYLI

[72] Inventors: John Arnaud Phillips, Thames; John William Cowlin, London, both of England

[73] Assignee: Evershed & Vignoles Limited, London, England

[22] Filed: Nov. 9, 1970

[21] Appl. No.: 87,947

[52] U.S. Cl..................346/76 R, 219/543, 338/309, 346/139 C
[51] Int. Cl..............................................G01d 15/10
[58] Field of Search.............346/76 R, 139 C, 139 R; 178/94; 219/543; 338/306, 307, 308, 309

[56] References Cited

UNITED STATES PATENTS 1,820,088  8/1931  Parker et al..............346/76 R
2,644,738  7/1953  Gardner...................346/76 R
2,934,736  4/1960  Davis.........................338/308
3,438,056  4/1969  Bjork.......................346/76 R

FOREIGN PATENTS OR APPLICATIONS 985,820  3/1965  Great Britain.........346/139 C Primary Examiner—Joseph W. Hartary
Attorney—Kemon, Palmer & Estabrook

[57] ABSTRACT

A thermal stylus has as its heating element an electrically resistive coating on an elongate electrically insulating core, the two ends of the coating having electrical connections for establishing a current path longitudinally through the coating. Preferably, a hollow ceramic core is coated with tin oxide and one of the electrical connections passes through the hollow core.

8 Claims, 4 Drawing Figures

PATENTED SEP 5 1972　　　　　　　　　　　3,689,937

Inventors
John A. Phillips
John W. Cowlin
By Kenyon, Palmer & Estabrook
Attorneys

RECORDING STYLI AND CONTROL CIRCUITS FOR STYLI

In one method of marking a record medium, a heated stylus writes on heat-sensitive paper. This method is sometimes used in strip chart recorders, for example. Rectilinear recording can be made without the use of complicated stylus arm linkages if the paper is passed over a sharp radius and the stylus is in the form of a thin rod the cylindrical surface of which contacts the paper. In one known form, a single resistance wire stretched between supporting members is used. However, it is difficult to make such a stylus sufficiently robust to withstand high frequency vibration and it is not sufficiently resistant to wear. In another form, the stylus is a tube containing a fine coil of resistance wire. This has the disadvantage that the diameter of the tube is not really small enough to give a sharp trace and the inertia of the stylus may be high enough to impair the frequency response.

According to the present invention, a thermal stylus has an electrically resistive coating on an elongate electrically insulating core and has electrical connections for connecting the ends of the coating to a power source, the connections establishing a current path longitudinally through the coating; when a heat-sensitive record paper is in contact with the outer surface of the stylus the paper is marked as a consequence of heating from the said electrical coating due to the flow of current through the coating. In the preferred form of stylus embodying the invention the core is hollow and one of the electrical connections to the coating passes through the hollow core. We prefer to use ceramic as a core material and tin oxide for a coating material. Such a stylus is very robust electrically, mechanically and chemically and has a surface hardness approaching that of a diamond. This reduces wear and consequently gives the stylus a long life. As the diameter of the stylus may be as little as 0.040 inches, it is small enough to give sharp trace when its cylindrical surface contacts the record medium and the inertia of the stylus is low. The coating may advantageously have a resistance of approximately 100 ohms., with which a high writing speed can be attained without an inconveniently large current. The length of the stylus should be enough to permit any soldered joints to be removed from the main area of heat.

In apparatus embodying such a thermal stylus, it is advantageous to arrange for the driving means which moves the stylus with respect to a record medium to control the heating of the stylus. In this way greater current is supplied to the stylus when it is actually moving. This prevents the stylus from overheating due to too great a heat input while it is stationary, for example if its driving amplifier has failed.

In order that the invention may be better understood, one example of apparatus embodying the invention will now be described with reference to the accompanying drawings, in which.

Figures 1, 2:
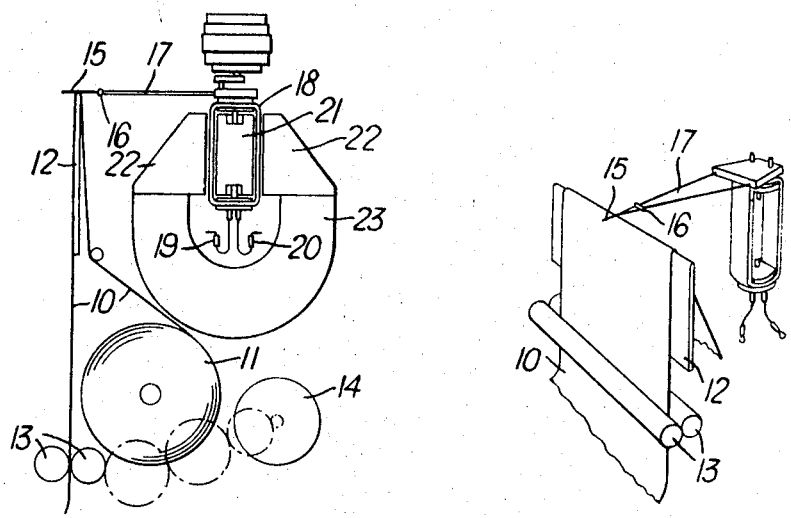
FIGS. 1 and 2 show a recording mechanism suitable for use with a stylus embodying the invention.

In the arrangement shown in FIGS. 1 and 2, a chart 10 constituting the record medium extends from a paper supply roll 11 over a carrier plate 12. The carrier plate 12 has an upper edge of sharp radius over which the chart passes. The chart is drawn from the supply roll and over the edge by pinch rollers 13 driven by a chart drive motor 14.

The stylus 15 is pivoted at 16 to an arm 17. The pivot 16 permits the stylus to ride up and down with any irregularities in the chart thickness. The arm 17 is connected to a moving coil 18 having connections 19 and 20 for receiving the input signal controlling the stylus movement, the moving coil being arranged within a gap between a core 21 inside the coil and pole pieces 22 of a magnet 23, the pole pieces being outside the coil. Thus, when an electrical signal is received by the coil 18 it rotates about its axis of suspension and moves the stylus along the edge of the record medium as it passes over the edge of the carrier plate 12.

Figure 3:
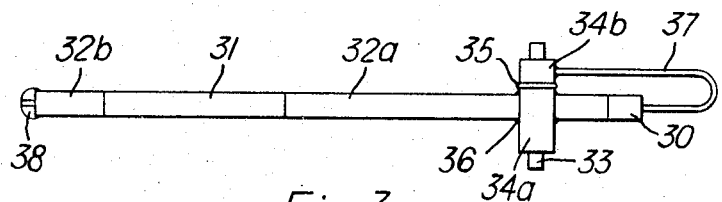
FIG. 3 illustrates the stylus.

The stylus shown in FIG. 3 consists of a hollow ceramic former 30 over a part of the length of which there is deposited an oxide film 31. The remainder of the surface is given a metallizing coating 32a and 32b.

A stylus pivot 33 has a conductive outer surface divided into two portions 34a and 34b by an insulator 35. The portion 34a is electrically connected to the metallizing coating 32a by means of soft solder 36. The portion 34b of the outer surface of the pivot arm is connected to a wire 37 which passes through the hollow ceramic former 30 and is connected to the metallizing coating 32b by means of a hard solder joint 38. The stylus length in this example is 2 inches (5 centimeters).

The cooling of the stylus varies with the stylus movement and consequently the heat input to the stylus must be varied. We have found that the optimum heat required by the stylus is affected by its frequency of movement, its amplitude of movement and the speed of the chart. To produce this optimum heat, the required variation of power input has a ratio greater than 10:1. Moreover, an increase in power input needs to be applied substantially instantaneously when the demand arises. Similarly, a delay in decreasing the power into the stylus when the frequency or amplitude of the pen movement decreases can result in catastrophic overheating. A change in chart speed, however, does not normally produce a dangerous condition if the heat input is not changed.

Figure 4:
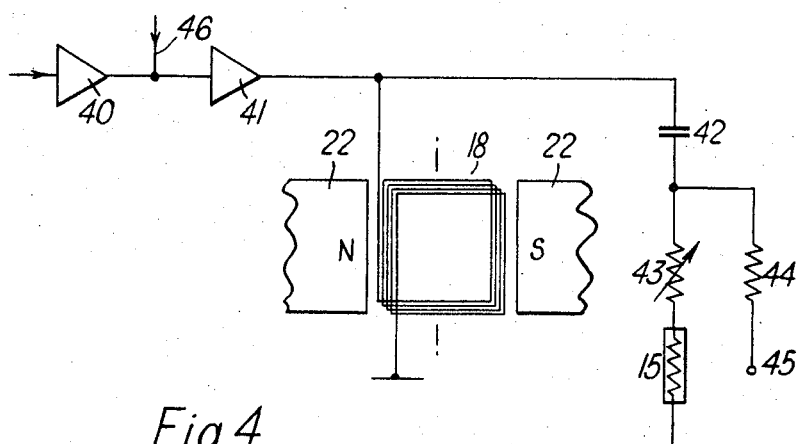
FIG. 4 is a block diagram of the electrical control circuit.

The manner in which we control the heat input to the stylus is illustrated by the electrical control circuit of FIG. 4. The AC input signal for the moving coil which drives the stylus passes through an input amplifier 40 and a driving amplifier 41 before reaching the moving coil 18. If the amplitude of the input signal changes, without change of frequency, the amplitude of movement of the coil between the pole pieces 22 will change. If the moving coil is required to move at an increased frequency, without change of amplitude of movement, the output signal must increase in amplitude as well as frequency because a higher voltage is necessary across the coil to drive it at this increased frequency. Consequently, for both change of stylus movement frequency and change of stylus movement amplitude there is a change in amplitude of the signal at the output of the driving amplifier 41. In the circuit shown, this amplitude change is applied through a coupling capacitor 42, which may have a value of about 50 microfarads, and a variable resistor 43 to the stylus 15. The amplitude of the AC voltage derived from the moving coil circuit does not correspond exactly with the optimum heat required by the changes in frequency and amplitude but it does enable a good trace to be obtained. The circuit has the added advantages of low cost and complexity and of being practically fail-safe.

The variable resistor 43 provides a manual control in series with the stylus resistance which sets the overall level of trace intensity, taking into account chart speed, variations in the type of signal (for example squarewave pulses, sinewave signals etc.) and customer preference with regard to trace intensity.

A fixed resistor 44 connected to the junction of the capacitor 42 and the variable resistor 43 provides a current path through the stylus from a terminal 45. The voltage at the terminal 45 gives rise to a constant current through the stylus which gives a minimum standing level of heat when there is no AC input signal present at the input. The manual control 43 affects this standing current as well as the signal current. The line 46 is for the insertion of a resetting signal.

If closer correspondence with the optimum heat input is required, the heat input to the stylus can be controlled by supplying the electrically resistive coating of the stylus with pulses of current from a pulse generator such that it produces one pulse for each cycle of the recording frequency; it can be arranged to vary the pulse width (i.e. duration) in accordance with the recording amplitude.

The circuit generating the pulses may have a controlling element used in a switching mode and therefore not subject to high dissipation. However, such a circuit is more complex than that shown in FIG. 4.

We claim:
1. Recording apparatus comprising:
a thermal stylus having an elongate electrically insulating core, an electrically resistive coating on the said core, and electrical connections attached to the ends of the coating for connecting the coating to a power source, the connections establishing a current path longitudinally through said coating;
a record medium support having an edge of small radius;
means for supporting said stylus so that it extends transversely across the said support edge and contacts a record medium passing around the said edge;
and means responsive to an electrical signal for moving said stylus along said edge, whereby a heat-sensitive record medium in contact with said electrically resistive coating is marked in a pattern determined by movement of said stylus along said edge when a heating current flows through said coating.

2. Recording apparatus as defined in claim 1, in which said electrically insulating core is hollow and one of said electrical connections passes through the hollow core.

3. Apparatus as defined in claim 1, further comprising a servo amplifier connected to apply a common signal for controlling the movement of the stylus along a record medium passing over said edge and also for controlling the supply of current to the stylus, the control being such that the periods of increased heating of the stylus substantially correspond to the periods in which the stylus is moving.

4. Apparatus as defined in claim 1, in which the means for moving the stylus includes a coil to which the stylus is attached and which is arranged in a magnetic field, and means applying an alternating signal to said coil, the apparatus further comprising means including a coupling capacitance for applying the alternating signal to the stylus to provide a heating current for the stylus.

5. Apparatus as defined in claim 4, including means for applying a continuous DC potential across the stylus to provide a minimum standing level of heat.

6. Apparatus as defined in claim 4, including an adjustable resistance in series with the stylus to provide a manual control of trace intensity.

7. Apparatus as defined in claim 1, in which the stylus is pivoted to a supporting arm to permit free pivotal movement of the stylus in a plane perpendicular to the line of the edge.

8. Recording apparatus comprising a thermal stylus, the thermal stylus having an elongate electrically insulating hollow core, metallizing coatings on two end portions of the said core and an electrically resistive coating on the portion of the core between the said end portions, electrical connections attached to the two metallizing coatings for connecting the resistive coating to a power source and establishing a current path longitudinally through the resistive coating;
a record medium support having an edge of small radius;
means for supporting said stylus so that it extends transversely over the said support edge to contact a record medium passing around said edge;
and means responsive to an electrical signal for moving said stylus along said edge; whereby a heat-sensitive record medium moving over the said edge and in contact with the said resistive coating when a current flows through the coating is marked, as a consequence of heat received from the said coating, in a pattern determined by the movement of the said stylus along said edge.

* * * * *